United States Patent
Lacroix et al.

(10) Patent No.: US 6,634,276 B1
(45) Date of Patent: Oct. 21, 2003

(54) PNEUMATIC BOOSTER WITH SELECTIVE AND CONTROLLED STRESS SELF-ASSISTANCE

(75) Inventors: Stéphane Lacroix, Tournan en Brie (FR); Jean-Pierre Gautier, Aulnay Sous Bois (FR); Philippe Richard, Chelles (FR); Pierre Pressaco, Aulnay Sous Bois (FR); Fernando Sacristan, Barcelona (ES); Juan Simon Bacardit, Barcelone (ES); Bruno Berthomieu, Barcelona (ES)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 09/673,984

(22) PCT Filed: Aug. 31, 2000

(86) PCT No.: PCT/FR00/02412

§ 371 (c)(1),
(2), (4) Date: Aug. 6, 2001

(87) PCT Pub. No.: WO01/17831

PCT Pub. Date: Mar. 15, 2001

(30) Foreign Application Priority Data

Sep. 3, 1999 (FR) .............................................. 99 11251

(51) Int. Cl.[7] ................................................. F15B 9/10
(52) U.S. Cl. ..................... 91/369.3; 91/376 R
(58) Field of Search ........................ 60/552, 553, 574; 91/369.1, 369.2, 369.3, 376 R

(56) References Cited

U.S. PATENT DOCUMENTS 4,619,185 A * 10/1986 Mori et al. ................ 91/376 R
5,553,530 A * 9/1996 Endo et al. ................ 91/369.3

* cited by examiner

Primary Examiner—Edward K. Look
Assistant Examiner—Igor Kershteyn
(74) Attorney, Agent, or Firm—Leo H McCormick, Jr.; Warren Comstock

(57) ABSTRACT

The invention relates to a pneumatic servomotor for an assisted braking, comprising a rigid casing (1) in which a moving airtight partition wall (2) defines a front chamber (3) and a rear chamber (4), a pneumatic piston (5) travelling with the moving partition wall (2), a plunger (8), housed within the piston (5) and driven by a control rod (7) and controlling the state of a three-way valve (9), force-transmitting means (10, 13, 17, 18, 31), adapted for receiving and transmitting at least one assistance force (Fa), exerted by a front face (51) of the piston (5) when the valve (9) puts the rear chamber (4) under a second pressure (Pa), the plunger (8) including a front section (81) comprising retaining means (18, 31) intended to tie down the front section (81) of the plunger (8) to the pneumatic piston (5).

According to the invention, the retaining means comprise a unidirectional clutch device (31, 18) for the driving of the force-transmitting means (10, 13, 17), independently of the control rod (7) and of the rear section of the plunger (8) when they are biased by the pneumatic piston (5), as a result of the actuation of the control rod (7), the speed of which is higher than a predetermined value.

11 Claims, 12 Drawing Sheets

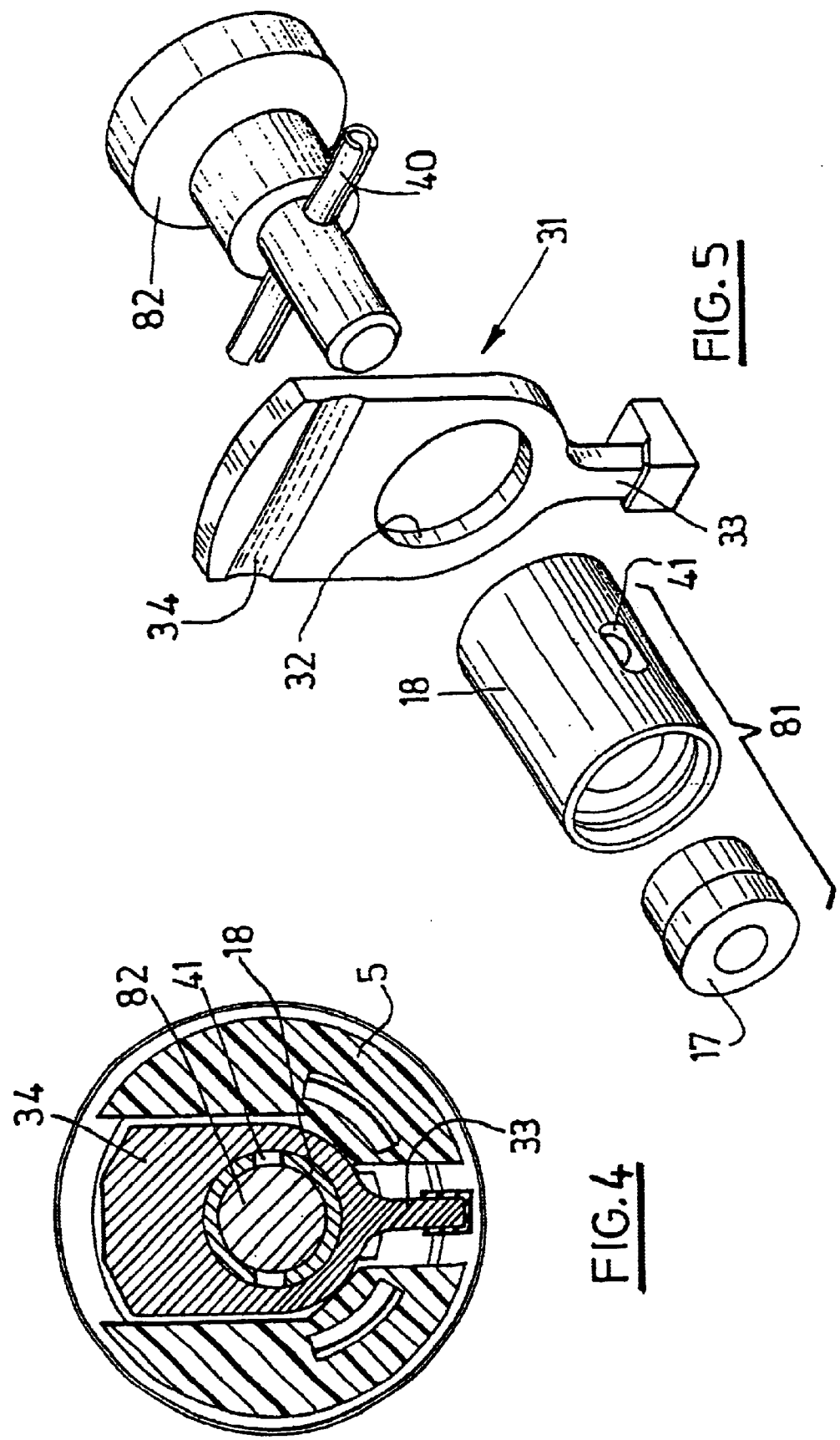

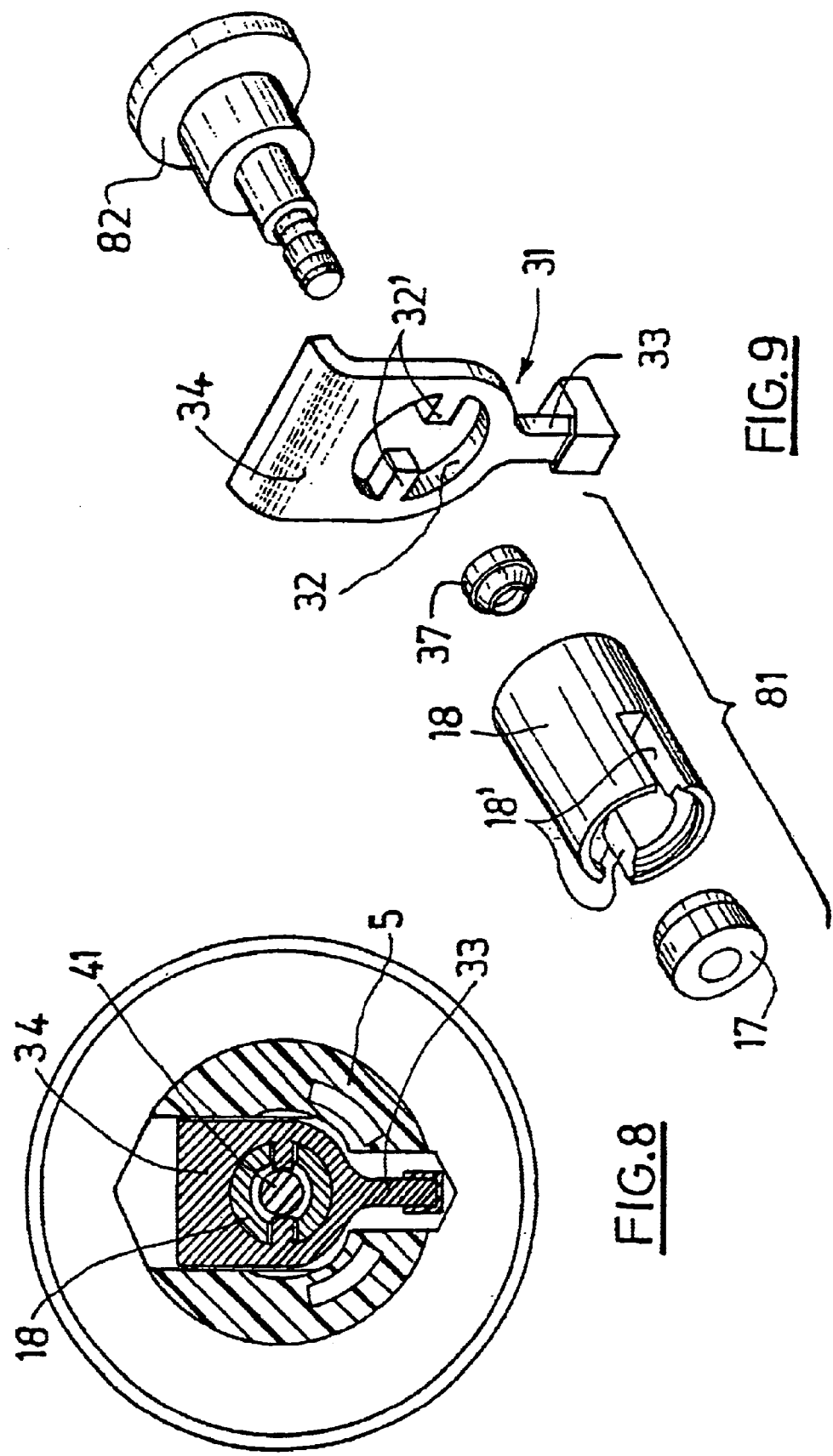

PNEUMATIC BOOSTER WITH SELECTIVE AND CONTROLLED STRESS SELF-ASSISTANCE

This invention relates to a pneumatic servomotor used for assisting in the braking of motor vehicles.

More particularly, the present invention relates to a pneumatic servomotor for an assisted braking, comprising: a rigid casing; a moving airtight partition wall, defining a front chamber and a rear chamber inside the casing, the front chamber being operatively under a first pressure and the rear chamber being selectively connected to the first chamber or under a second pressure higher than the first one; a pneumatic piston travelling with the moving partition wall; a control rod, moving inside the piston as a function of an input force, selectively exerted in an axial actuation direction towards the front chamber, and of a return force, applied by a main spring in an axial return direction, reverse to the axial actuation direction, the return force biasing the control rod towards a rest position, while the input force biases the control rod towards either an intermediate actuation position or an end actuation position, depending on whether the input force is applied at a speed which is lower or higher than a given limit speed a plunger, housed within the piston and driven by the control rod; a three-way valve, including an annular seat borne by a rear section of the plunger, such valve connecting the rear chamber with the front chamber when the control rod is in the rest position, and subjecting the rear chamber to the second pressure when the control rod is in one of its actuation positions; force-transmitting means, adapted for receiving and transmitting at least one assistance force, exerted by a front face of the piston when the valve puts the rear chamber under the second pressure, the plunger including a front section comprising retaining means, intended to tie down the front section of the plunger to the pneumatic piston.

BACKGROUND OF THE INVENTION

Such devices are well-known from the prior art, as disclosed, for instance, in patent specifications U.S. Pat. No. 3,470,697, FR-A-2 532 084 and FR-A-2 658 466.

Recent investigations revealed that quite a number of drivers, when confronted with an emergency braking situation, underestimated the risks actually incurred and, after having jammed the brakes on, would somewhat release the braking force at the very time when a considerable force should have been maintained in order to avoid an accident.

This established fact led to various solutions aiming at correcting possible behaviour lapses of a driver, whether inexperienced or panic-stricken.

SUMMARY OF THE INVENTION

Therefore, it is the object of the present invention to provide a simple solution to the above-mentioned problem regarding the maintenance of a high braking force, following the jamming on of the brakes.

This object is achieved in that the servomotor according to the invention, as defined in the above introductory section, is characterised in that the retaining means comprise a unidirectional clutch device for the driving of the force-transmitting means, independently of the control rod and of the rear section of the plunger when they are biased by the pneumatic piston, as a result of the actuation of the control rod, the speed of which is higher than a predetermined value.

In accordance with a feature of the present invention, the unidirectional clutch device comprises a cylindrical sleeve, capable of freely sliding around a front part of the rear section of the plunger, and a locking key including a central opening surrounding the sleeve and having an inner diameter slightly greater than the outer diameter of the cylindrical sleeve, and provided with a first and a second indexing parts, diametrically opposed in relation to the central opening.

At rest, and under the action of a resilient means, the locking key advantageously bears on a stationary part of the servomotor through the first indexing part, and on the pneumatic piston through the second indexing part.

Preferably, at rest, the sleeve is biased backwards into abutment against a shoulder on the rear section of the plunger, via a resilient means.

The front section of the plunger may comprise a finger, slidingly fitted on the front end of the rear section of the plunger, the finger being capable of contacting the reaction disk when the sleeve is biased by the locking key, as a result of the actuation of the control rod, the speed of which is higher than a predetermined value.

The rear rest position of the plunger may advantageously be defined by the bearing on the locking key, under the action of the main spring, of a stop member situated on the rear section of the plunger.

In that case, the rear section of the plunger may consist of a pin, perpendicular to the plunger axis and passing through elongated openings made in the sleeve.

The stop member, located on the rear section of the plunger, may also be constituted by a shoulder, cooperating with at least one part of the locking key, traversing a slot provided in the sleeve.

According to another embodiment, at rest, the first indexing part of the locking key bears on an intermediate element, bearing itself on a stationary part of the servomotor.

The unidirectional clutch device then may advantageously be contained in a cartridge, constituting the front face of the pneumatic piston, the intermediate element protruding rearward from the cartridge.

Other features and advantages of the present invention will be apparent from the following detailed description, by way of example and by no means as a limitation, when taken in conjunction with the accompanying drawings.

BRIEF DESCRIPTION OF THE DRAWINGS

FIG. 4 is a cross-sectional view, in a perpendicular plane to the sectional planes of FIGS. 2 and 3, of the hub of the servomotor, shown in FIGS. 2 and 3;

FIG. 5 is an exploded view of the plunger of the servomotor shown in FIG. 2 through 4;

FIG. 8 is a cross-sectional view, in a perpendicular plane to the sectional plane of FIGS. 6 and 7, of the hub of the servomotor, shown in FIGS. 6 and 7;

FIG. 9 is an exploded view of the plunger of the servomotor, shown in FIGS. 6 through 8;

DETAILED DESCRIPTION OF THE INVENTION

Figure 1:
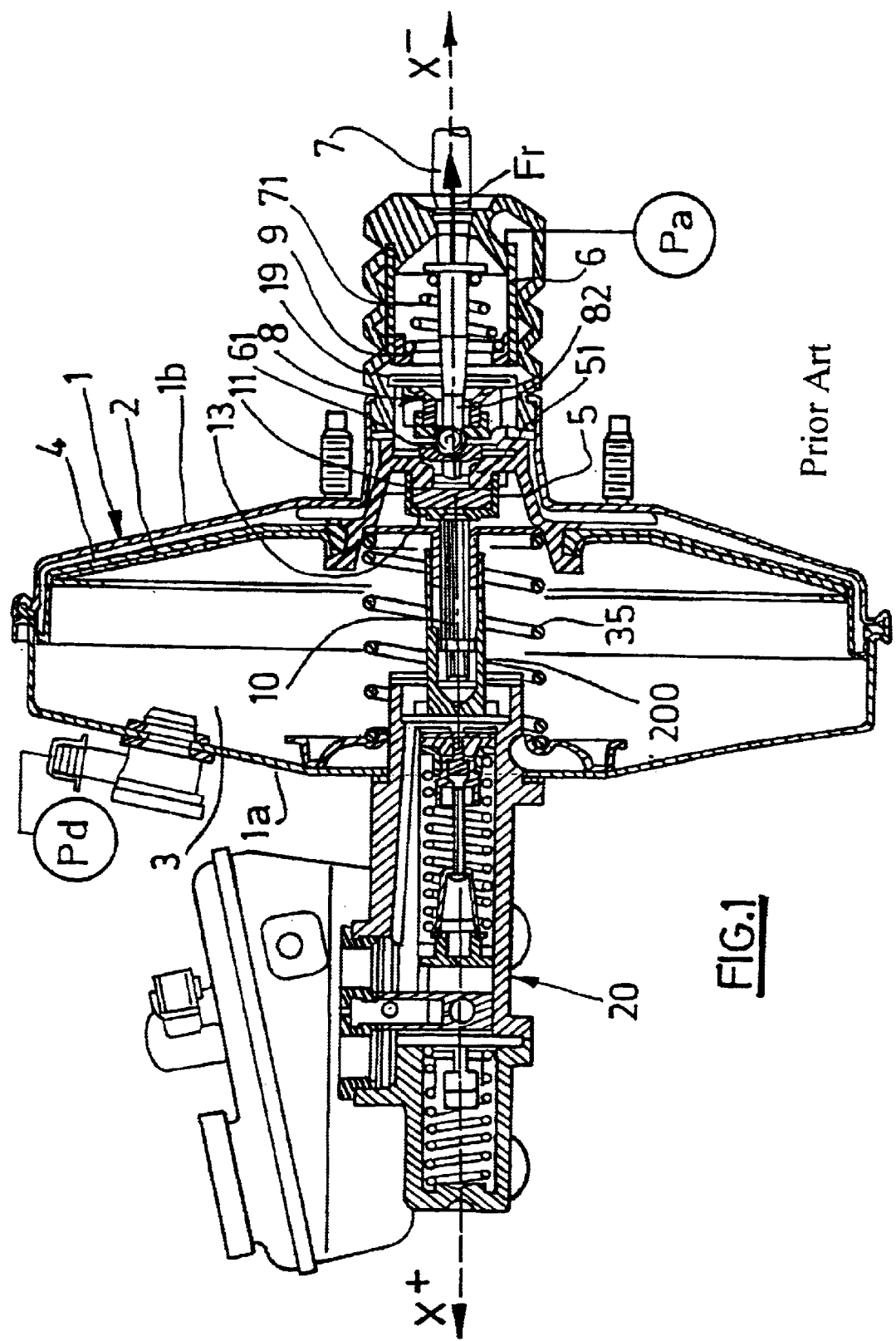
FIG. 1 is a longitudinal sectional view, showing a servomotor according to the prior art

FIG. 1 illustrates, in a sectional view, a pneumatic servomotor for an assisted braking and intended for a conventional installation between the brake pedal (not shown) of a motor vehicle and the master cylinder 20 controlling the pressure in the hydraulic braking circuit of such vehicle.

As a rule, the part of the servomotor facing the master cylinder 20 will be called the "front part" and the part of the servomotor facing the brake pedal will be referred to as the "rear part". Thus, in FIG. 1, the front part is on the left-hand side whereas the rear part is on the right-hand side.

The pneumatic servomotor for the assisted braking comprises, in a manner known per se, a front shell 1a and a rear shell 1b, making up a rigid casing 1.

A moving partition wall 2 divides, in an airtight manner, the inner space of this rigid casing 1 and defines therein a front chamber 3 and a rear chamber 4, the front chamber 3 being operatively under a first pressure Pd, which is comparatively low.

A pneumatic piston 5 travels with the moving partition wall 2 and comprises a hub 6, slidably mounted in an opening 19 of the casing 1.

The servomotor is driven by a control rod 7, displaceable in the hub 6 between a rest position illustrated in FIG. 1 and an end actuation position, the position of such rod in the hub being dependent, in particular, on an input force Fe, applied to such rod in an axial actuation direction X+ by the brake pedal (not shown), on the speed at which the input force Fe is applied, on the return force Fr exerted in the reverse direction X− by a main return spring 71, and on a reaction force acting in the same direction as the return force.

When the input force Fe is slowly applied to the control rod 7, the latter takes an intermediate actuation position, between its rest position, represented in FIG. 1, and its end actuation position but the control rod does not reach its end actuation position until the input force Fe is applied at a higher speed than a given limit speed.

A plunger 8, driven by the control rod 7, is slidably mounted in a bore 61 provided in the hub 6 in order to control the state of a three-way valve 9.

Such valve 9 mainly comprises a fixed annular seat 91, provided on the inner periphery of the hub 6, a moving annular seat 92, concentric with the fixed seat 91 and borne by a rear section 82 of the plunger 8, and a tubular flap 93, which itself is concentric both with the plunger and with the hub.

The tubular flap 93 has an annular sealing front face, designed to cooperate, depending on the position of the plunger 8, either with the moving seat 92 or with the fixed seat 91.

In a well-known manner, when the servomotor is at rest, as shown in the drawings, the flap 93 bears on the moving seat 92 and isolates the rear chamber 4 from a pressure source, generally the atmosphere, which delivers a pressure Pa, higher than the pressure Pd to which the front chamber 3 is subjected.

But, on the other hand, when an input force Fe, somewhat greater than the return force Fr due to the spring 71, is applied to the rod 7, such force Fe causes the plunger 8 to move forward in the actuation direction X+, with the result that the flap 93 separates from the moving seat 92 and comes to rest on the fixed seat 91, the rear chamber 4 being then under the pressure Pa.

The air inflow into the rear chamber pushes the moving partition wall 2 in the actuation direction X+ and produces an assistance force Fa, acting on the front face 51 of the piston 5.

The input force Fe and the assistance force Fa are jointly applied to force-transmitting devices, which make use of them to operate the master cylinder 20, such force-transmitting means including reaction devices adapted for opposing to the input force Fe a reaction dependent on the assistance force Fa.

The drawings represent a servomotor which uses, as is well known, a reaction disk 13 made of an elastomeric material, accommodated in a cup 11 and receiving both the input force Fe, transferred by the plunger 8, and the assistance force Fa, acting on the front face 51 of the pneumatic piston 5.

The reaction disk 13 resists the input force Fe with a reaction varying directly as the assistance force Fa, and the cup 11, integral with a push rod 10, transfers to the primary hydraulic piston 200 of the master cylinder 20 the resultant of such forces, as well as of the return force Fr and of the spring force of a piston return spring 35.

According to this invention, the plunger 8 comprises a front section 81 and a rear section 82, its front section 81 and the force-transmitting means including respective. reversible retaining means, intended to tie down that front section 81 to the pneumatic piston 5 when the assistance force Fa exceeds a given threshold S whereas the control rod is in its end actuation position.

The front section 81 of the plunger 8 mainly comprises a cylindrical sleeve 18, capable of freely sliding around a front part of the rear section 82 of the plunger 8. The front section also comprises a finger 17, slidingly mounted on the front end of the rear section 82, this finger 18 being capable of contacting the reaction disk 13.

The sleeve 18 can travel between a shoulder, provided on the rear section 82 of the plunger, and the rear end of the finger 17.

At rest, the sleeve 18 is biased backwards into abutment against the shoulder located on the rear section 82 by a resilient means 21, such as a helical compression spring resting besides on a shoulder provided on the pneumatic piston 5, and arranged around the finger 17.

A locking key 31 is mounted around the front section 81 of the plunger 8. It has a central opening 32, the inner diameter of which is slightly greater than the outer diameter of the cylindrical sleeve 18, and two indexing parts 33 and. 34, diametrically opposed in relation to the central opening 32.

The locking key 31 is subjected to the rearward action of a resilient element 36 resting besides on the pneumatic piston 5, the resilient element 21 in the present embodiment consisting of a helical compression spring, located in an off-centered position with respect to the axis X+ X−, and situated near the indexing part 34.

Under the action of the spring 36, the locking key 31 bears, at rest, on the one hand, on a stationary part of the servomotor through the first indexing part 33 and, on the other hand, on the pneumatic piston 5 through the second indexing part 34.

Figure 2:
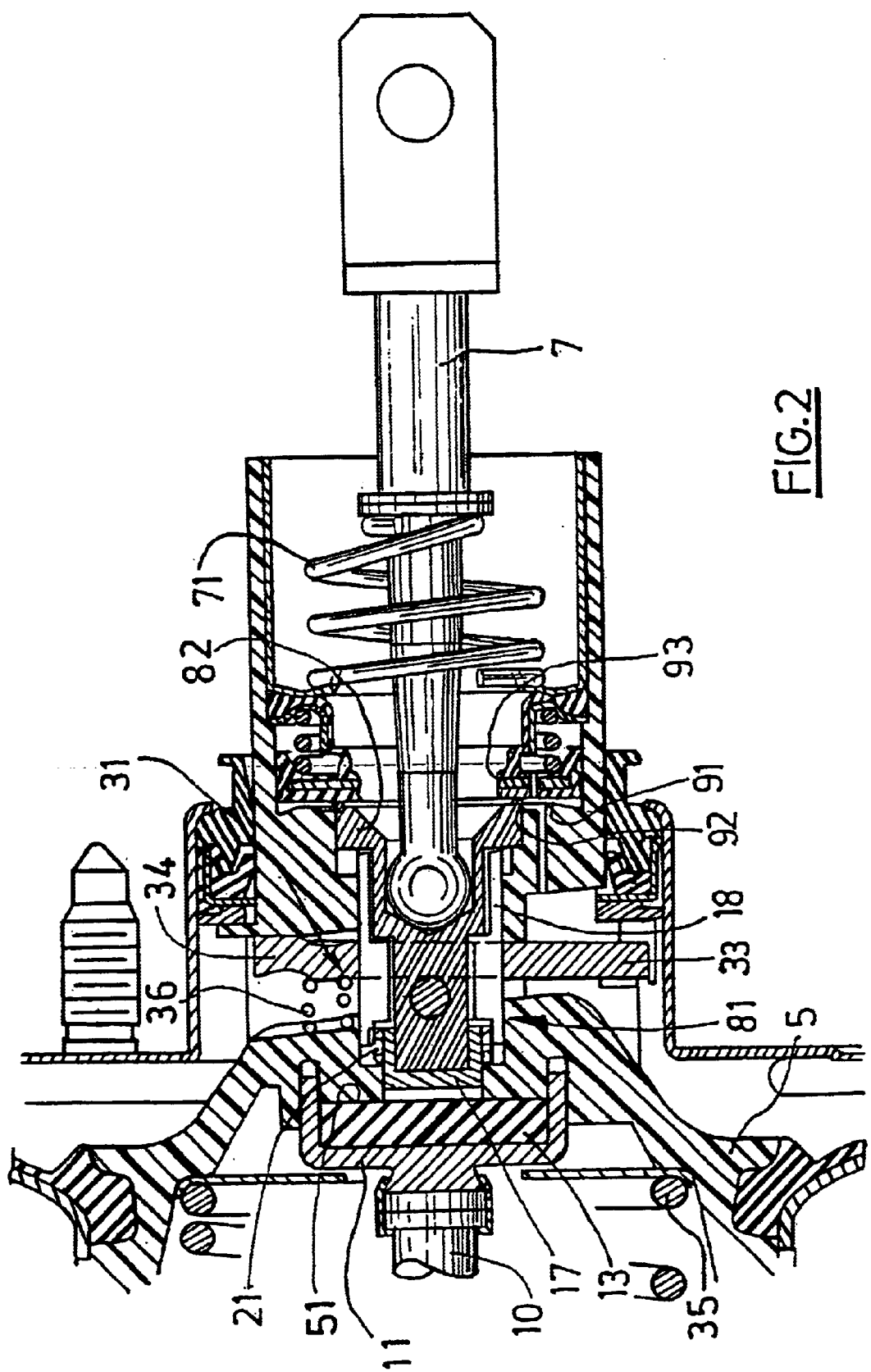
FIG. 2 is a longitudinal sectional view, showing the rear central part of a servomotor according to an embodiment of this invention.
Figure 3:
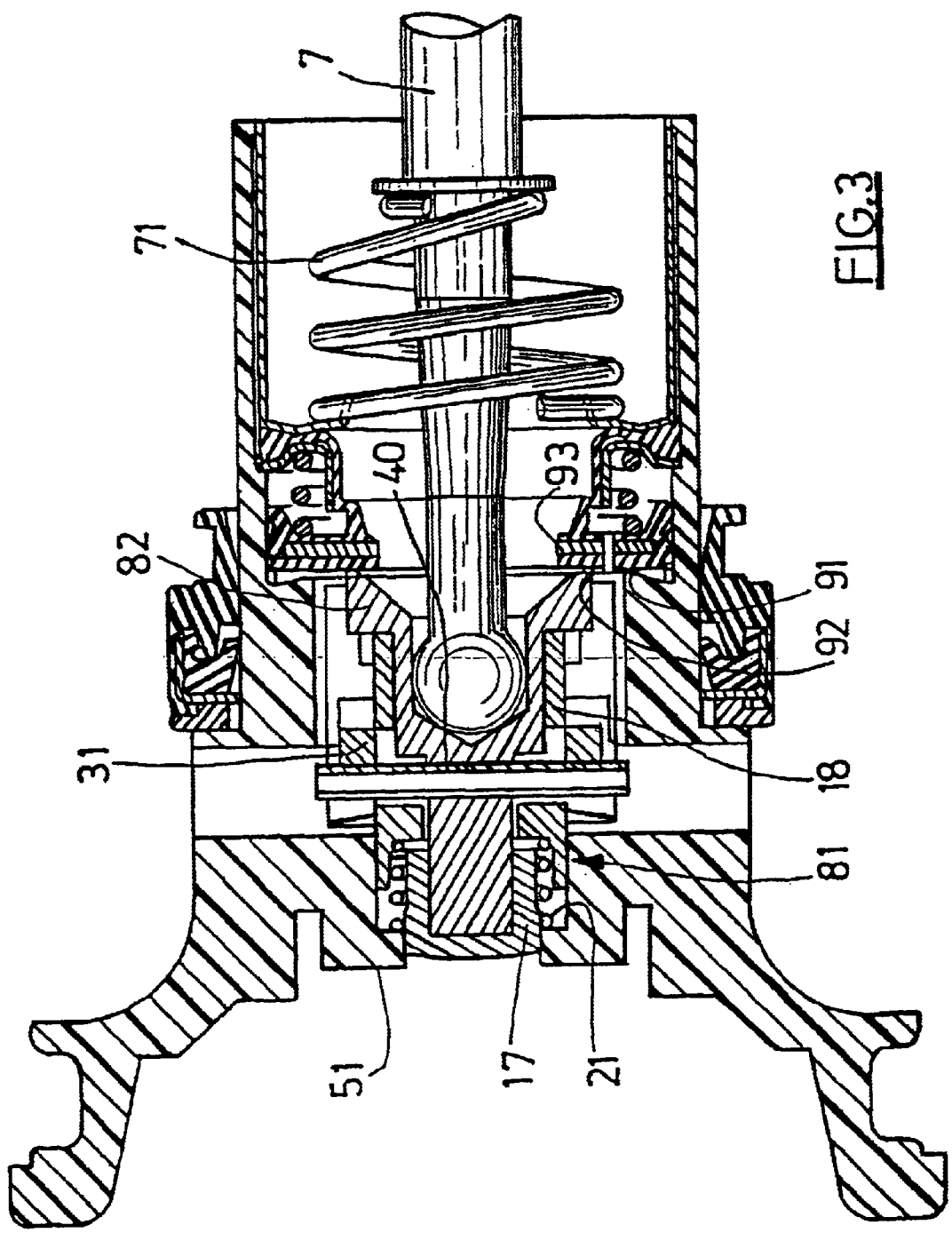
FIG. 3 is a longitudinal sectional view, in a perpendicular plane to the sectional plane of FIG. 2, showing the rear central part of the servomotor of FIG. 2.
Figure 6:
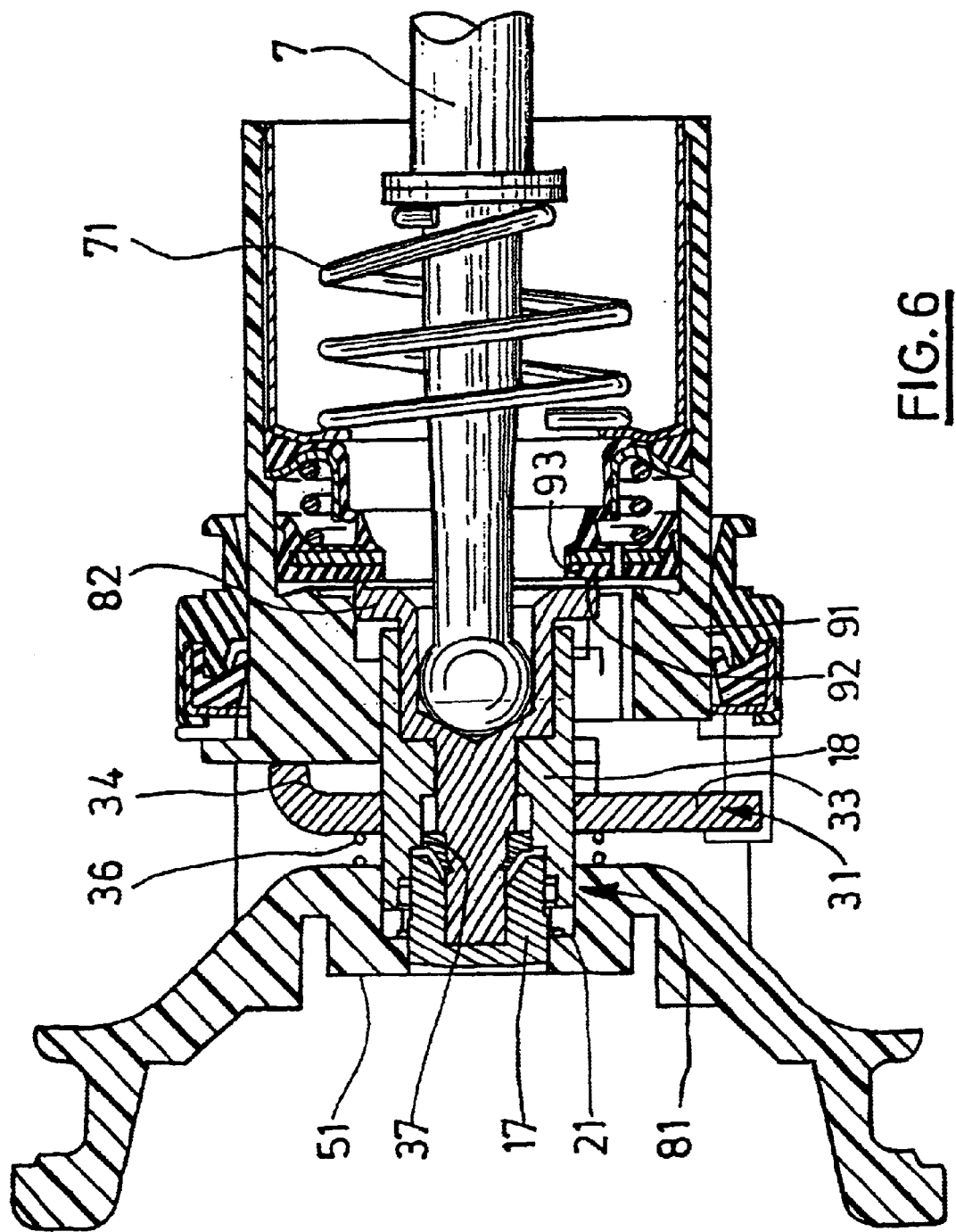
FIG. 6 is a longitudinal sectional view, showing the rear central part of a servomotor according to a variant of the first embodiment of this invention.
Figure 7:
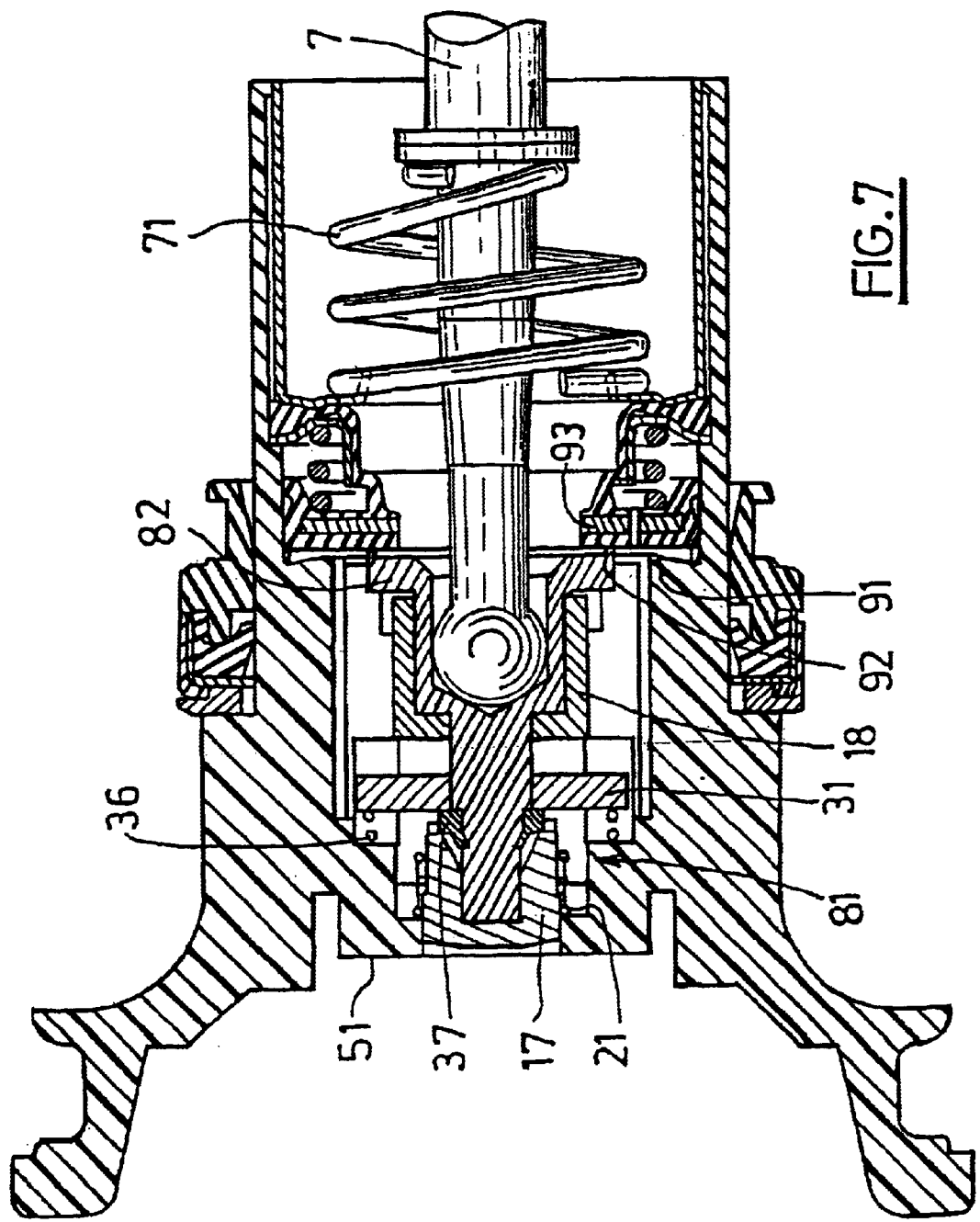
FIG. 7 is a longitudinal sectional view, in a perpendicular plane to the sectional plane of FIG. 6, of the rear central part of the servomotor according to FIG. 6.

When the servomotor is in its rest position, as shown in FIG. 2, the control rod 7 is drawn back in the return direction X− by the force Fr, exerted by a spring 71. The rear rest position of the control rod 7 and of the plunger 8, the rear section 82 of which is pivotally mounted on the front end of the control rod 7, is determined by the locking key 31.

More specifically, in the embodiment according to FIG. 2 through 5, the rear section 82 of the plunger 8 is traversed by a pin 40, perpendicular to the plunger axis and passing through elongated openings 41 cut in the sleeve 18 (FIG. 5).

In that way, the return spring 71 applies to the control rod 7 a rearward force transferred from the rear section 82 of the plunger and the pin 40 to the locking key 31 which, at rest, bears therefore both on the pneumatic piston 5 and on a stationary part of the servomotor. Thus, the locking key 31 acts simultaneously as a stop key for the plunger 8 in the course of its rearward stroke, in that it defines its rest position in relation to the pneumatic piston 5 while the rest position of the latter is set, on the other hand, in relation to the servomotor.

The mode of operation of the present invention will now be described with reference to FIG. 2 through 5.

When the servomotor is in its rest position, as shown in FIG. 2, the control rod 7 is drawn backward in the return direction X− under the action of the force Fr, exerted by the spring 71, with the result that the moving annular seat 92 is applied onto the flap 93.

This being so, the rear chamber 4 communicates with the front chamber 3 and is separated from the atmospheric pressure Pa. In this rest position, the spring 21 keeps the sleeve 18 in its rear position, in abutment against the rear section 82 of the plunger 8, so that there is a clearance J between the sleeve shoulder, which the spring 21 bears on, and the rear part of the finger 17. Such clearance J is smaller than the distance between the flap 93 and the fixed seat 91, which distance corresponds to the dead stroke of the servomotor. The front end of the finger 17 is, for its part, located at a distance from the rear face of the reaction disk, which is greater than the clearance J.

As already mentioned, if an input force Fe, somewhat greater than the return force Fr applied by the spring 71, is exerted on the control rod 7, the moving seat 92 separates slowly from the flap 93, which puts the rear chamber 4 to the atmosphere and makes the plunger 8 travel in the actuation direction X+. The air inflow into the rear chamber pushes the moving partition wall 2 in the actuation direction X+ and produces an assistance force Fa, acting on the front face 51 of the pneumatic piston 5.

During such travel, the plunger 8 has moved the sleeve 18 forward on a distance corresponding to the dead stroke of the servomotor, i.e. smaller than the clearance J, and the sleeve 18 slides within the opening of the locking key 31.

The assistance force Fa is applied by the pneumatic piston 5 onto the annular surface of the reaction disk 13, located around the front part of the finger 17. It results in a forward motion of the reaction disk 13, the cup 11 and the push rod 10, which actuates the primary piston 200 of the master cylinder 20, bringing about a pressure rise in the latter, and a reaction force on the push rod 10, such force being transmitted further to the reaction disk 13 by means of the cup 11.

The rear face of the reaction disk 13, pressed between the front face 51 of the pneumatic piston 5 and the cup 11, bulges out and contacts the finger 17, so that the reaction disk transfers further the reaction force, generated by the actuation of the master cylinder, to the finger 17, to the plunger 8 touching the finger 17 and to the control rod 7.

Under these actuating conditions, the servomotor operates in a conventional manner and the vehicle driver experiences the same feel of the brake pedal as that he is accustomed to.

On the other hand, if an input force Fe, evolving quickly, is applied to the control rod 7, the moving seat 92 separates from the flap 93 by a distance above that of the dead stroke of the servomotor and above that of the clearance J, so that the atmospheric pressure air port opens more widely than in the case of a normal braking action. Yet, the piston 5 is driven in the actuation direction X− X+ at a speed much lower than that of the stroke of the plunger 8. Under these conditions, the plunger 8 contacts the rear end of the sleeve 18 and the finger touches the reaction disk 13, the sleeve 18 sliding within the central opening 32 of the locking key 31.

Then the finger 17 compresses the reaction disk 13, which results in a motion of the push rod 10 and in the actuation of the master cylinder. In the course of this first phase of a quick actuation, the reaction force is transferred by the reaction disk and the finger onto the plunger and the control rod.

During the second quick actuation phase, since the air at the atmospheric pressure has entered the rear chamber 4 of the servomotor, it produces an assistance force on the moving partition wall 2, which force is applied to the pneumatic piston 5. Therefore the latter moves in the direction X+ and brings such assistance force to act on the indexing part 34 of the locking key 31. Due to the fact that the pneumatic piston 5 travels in the direction X+, the indexing part 33 is no longer in contact with the stationary part of the servomotor, so that the spring 36 causes the locking key 31 to rotate about the indexing part 34 and come to rest against the pneumatic piston 5.

As a result, the locking key 31 is latched on the sleeve 18 and drives it forward until it reaches the rear end of the finger 17. During this operating phase, the pneumatic piston 5 is driven by the moving partition wall 2 and strengthens the latching state of the locking key 31 on the sleeve 18. Then, the pneumatic piston 5 drives directly the sleeve 18 which, in turn, drives the finger 17, the reaction disk 13, the cup 11 and the push rod 10, actuating the master cylinder 20. The reaction due to the master cylinder actuation is therefore transmitted by the sleeve 18 onto the pneumatic piston 5 and it affects neither the plunger 8 nor the control rod 7, and it is not felt either by the driver who thus has, at his disposal, a maximum braking efficiency even though he may have eased to some extent the brake pedal connected to the control rod 7.

As a matter of fact, when. the brake pedal (not shown) is gradually released and, though the input force Fe is reduced, the locking key 31 remains blocked on the sleeve 18 as long as the valve seat 92 does not set apart the flap 93 from the fixed seat 91, so that a maximum assistance force is still applied to the master cylinder 20 during this brake-releasing phase. Such assistance force will not actually stops being applied until the valve seat 92 moves back in the direction X– enough to separate the flap 93 from the fixed seat 91, as a result of which the rear chamber 4 is connected again with the front chamber 3. At that time, the indexing part 33 of the locking key 31 will be in contact again with the stationary part of the servomotor, which motion releases the sleeve 18, and the servomotor resumes its rest position, as represented in FIG. 2.

FIGS. 6 through 9 show a variant of the embodiment described up to now, and in which the locking key moreover operates as the above-described pin 40. For this purpose, the central opening 32 of the locking key comprises at least one arm 32', and preferably two arms in the variant shown in FIG. 9, diametrically opposed and extending towards each other, such arms 32' being received in slots 18' provided in the sleeve 18. Besides, the plunger 8 is fitted with a stop-forming shoulder 37, e.g. an insert designed to prop against the arms 32', in the rest position, so as to define the rear rest position of the plunger 8 in relation to the pneumatic piston 5. These figures show as well that the spring 36 may be arranged coaxially with the plunger 8. The operation of the servomotor according to this variant is identical with that circumstantially explained above and such description will not be repeated here.

Figure 10:
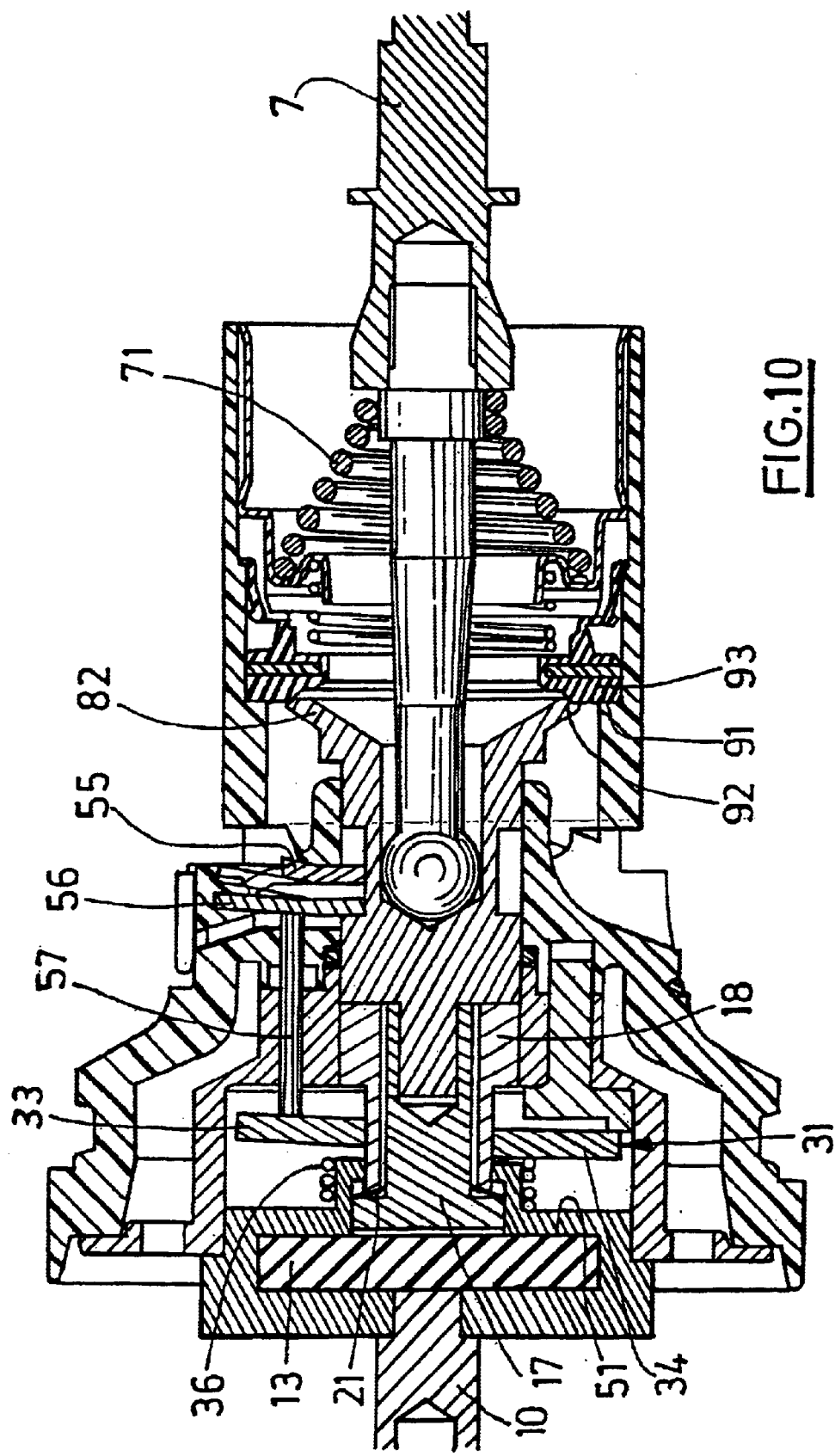
FIG. 10 is a longitudinal sectional view, showing the rear central part of a servomotor according to a second embodiment of this invention.

FIG. 10 represents a second embodiment in accordance with the present invention. It is apparent from FIG. 10 that the servomotor comprises, in a well-known manner, keys 55 and 56 intended to define the rest position of the plunger 8 in relation to the pneumatic piston 5, one key being stationary while the other is rockably mounted. According to this embodiment, the indexing part of the locking key 31 leans on the rocking key 56 through a peg 57, slidably mounted in a bore of the pneumatic piston 5, whereas the rocking key 56 is fixed, in the rest position, in relation to the servomotor and rocks only when in operation. Besides, the return spring of the sleeve 18 may be configured as a Belleville washer resting on a rear face of the finger 17.

Figure 11:
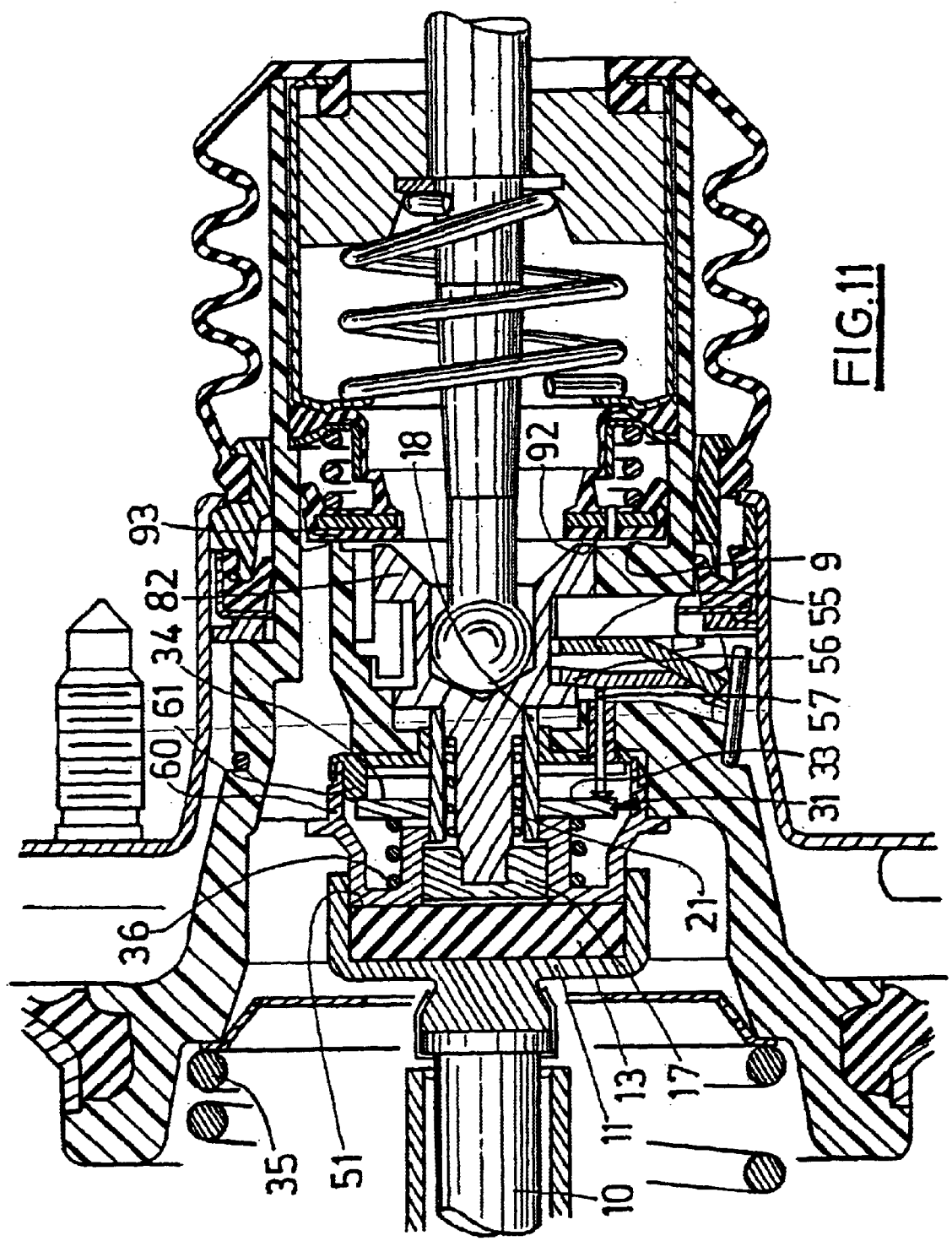
FIG. 11 is a longitudinal sectional view, showing the rear central part of a servomotor according to a variant of the second embodiment of this invention.
Figure 12:
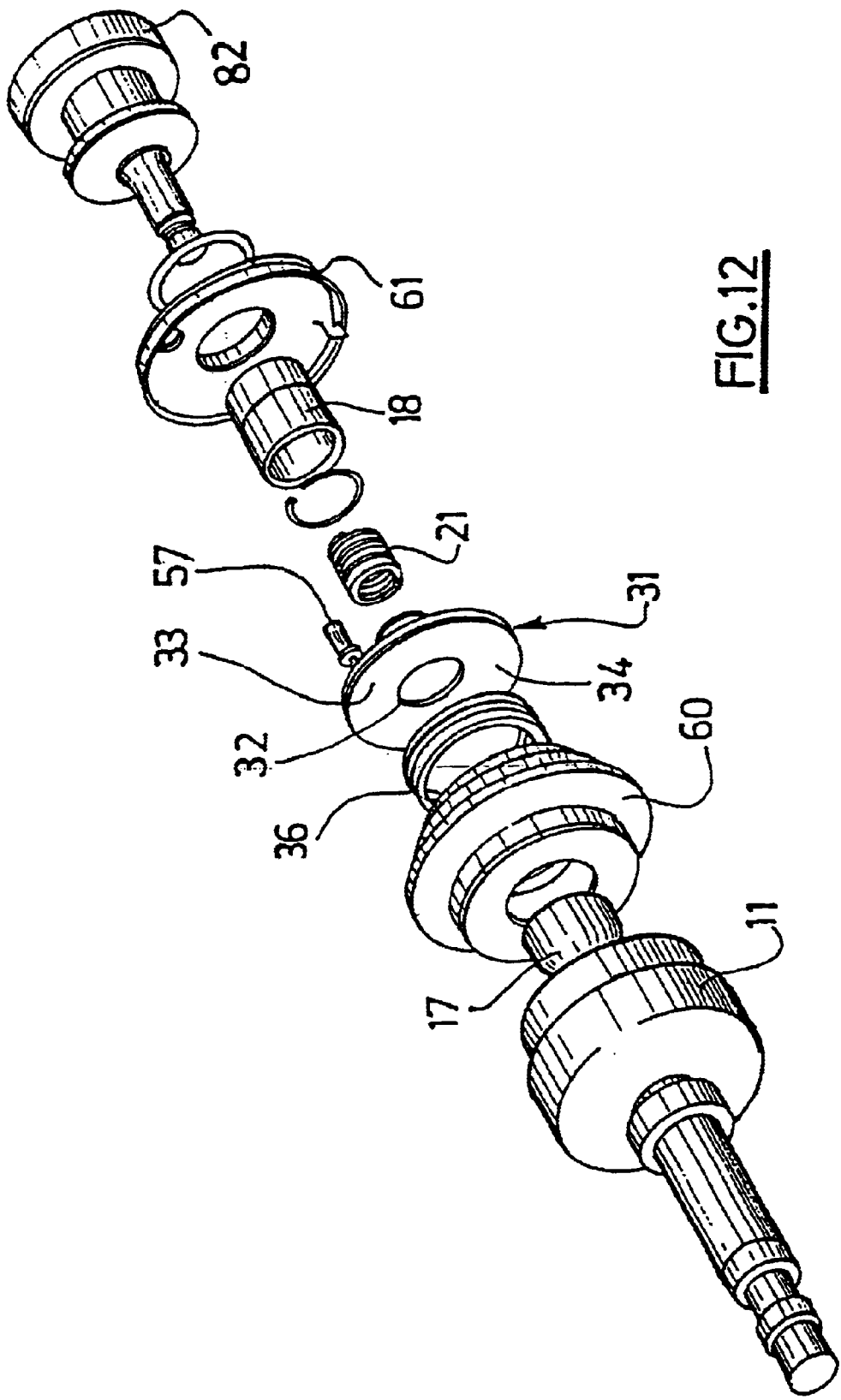
FIG. 12 is an exploded view of the plunger of the servomotor of FIG. 11.

FIGS. 11 and 12 show a variant of this second embodiment. According to such variant, a cup 60 is arranged in the pneumatic piston 5 so as to make up the front face 51 of the latter. This cup 60 is closed at its rear part by a cover 61, supported by the pneumatic piston 5. An opening 62 is made in the cover 61 and the sleeve 18 can freely slide in it, the plunger 8 being housed inside the sleeve 18 as already explained. The inner space of the cup accommodates the finger 17, the springs 21 and 36 and the locking key 31, and the peg 57 protrudes from the cover 61. The advantage of this variant resides. in that the device according to the invention is contained within a cartridge, easily installed in a conventional servomotor in order to give the latter the desired operating characteristics.

Figure 13:
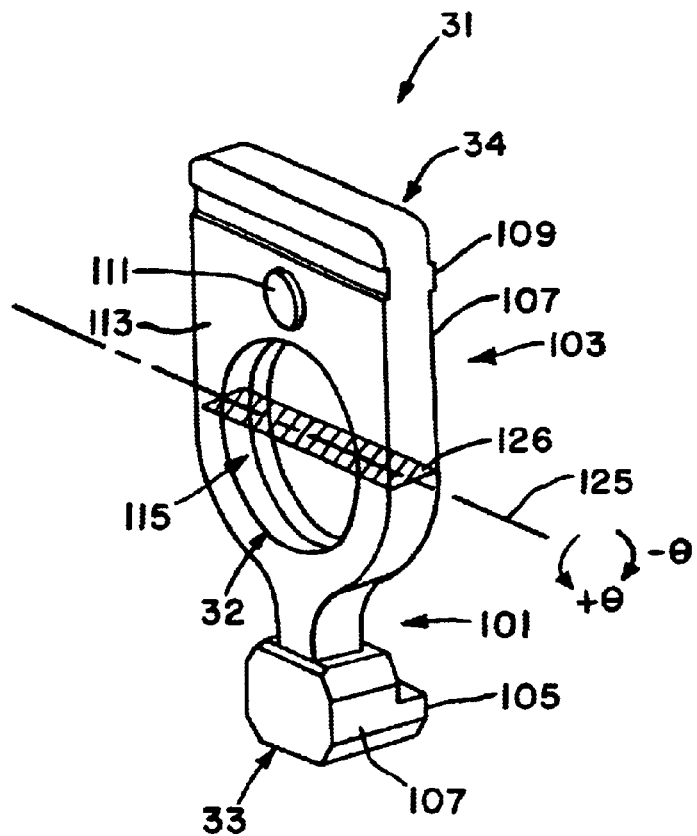
FIG. 13 is a three-quarter perspective view of the preferred embodiment of the locking key according to the present invention.
Figure 14:
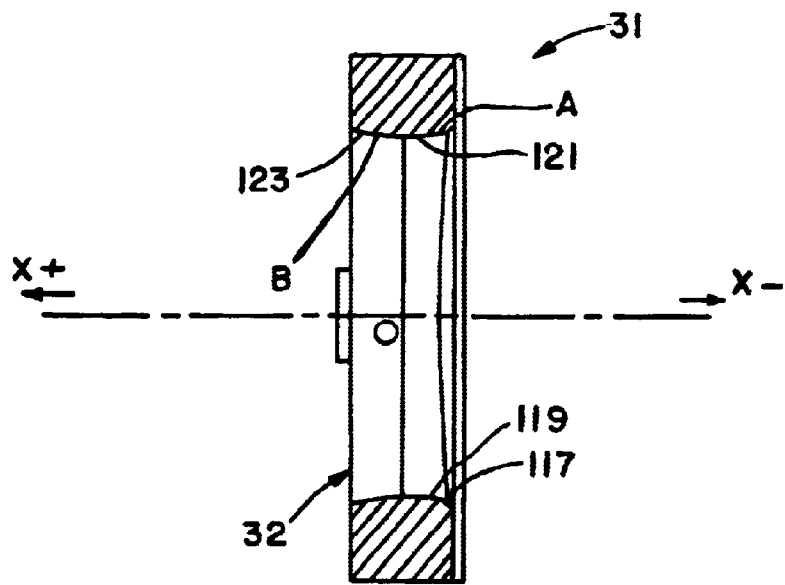
FIG. 14 is a cross-sectional view of the key shown in FIG. 13.
Figure 15:
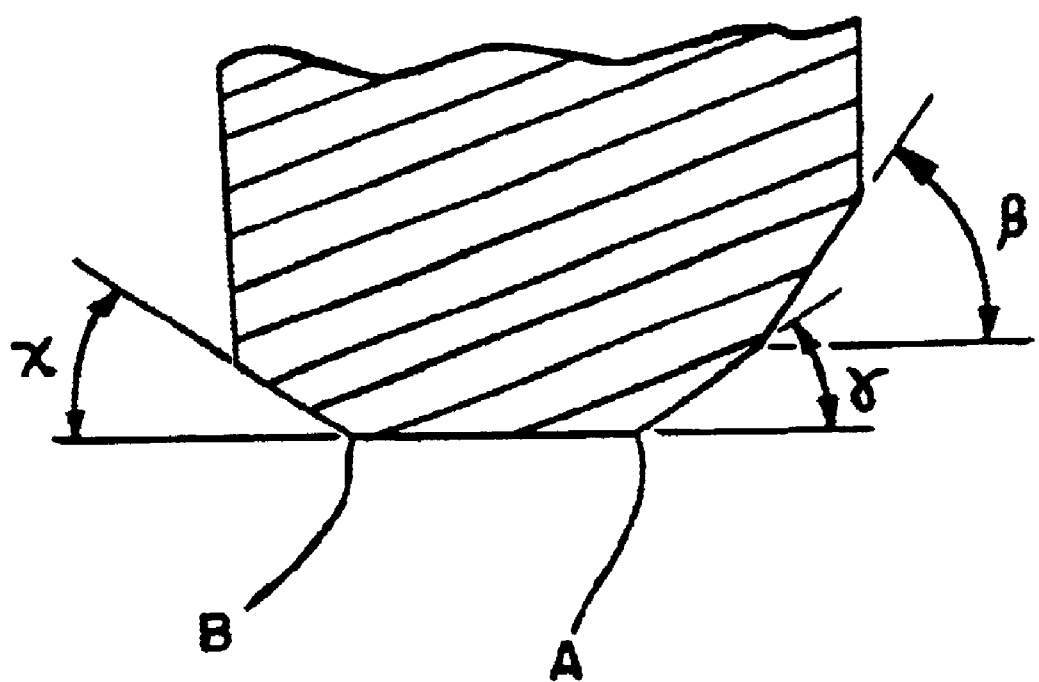
FIG. 15 is a detail from FIG. 14.

FIGS. 13 through 15 illustrate the preferred example of a locking key implementing the present invention, in which the key 31 comprises, at a first end, a first indexing part and, at a second end, a second indexing part, and a central opening, the inner surface of which exhibits a geometry enabling the locking and unlocking of the key in relation to a sleeve.

FIG. 13 shows a preferred embodiment of a key 31 according to this invention, which comprises a body 101 fitted, at a first end, with a first indexing part 33 and, at the second end, with a lock plate 103. The indexing part 33 has a bearing means 105, advantageously at right angles to the longitudinal axis of the key and directed rearwards, such means being moulded over the indexing part 33 in an advantageous manner.

The lock plate 103 comprises, at a first end, located in the opposite direction to the second end connected to the body 101, a second indexing part 34. This indexing part 34 comprises, on one face 107, a tongue 109 extending from a first side face of the lock plate to a second side face of the lock plate, advantageously perpendicularly to the longitudinal axis of the key, and advantageously too resulting from a stamping process. The indexing part 34 also has a teat 111, arranged on a face 113 at the level of the longitudinal axis of the key.

The lock plate 103 also has a central opening 32, the inner diameter of which is slightly greater that the outer diameter of the cylindrical sleeve 18.

FIGS. 14 and 15 show the inner surface 115 of the opening 32, said surface consisting of a succession of bores disposed in the direction X+ and comprising, in the preferred embodiment of the key 31 according to the invention, a first truncated-cone shaped bore 117 with a taper in the direction X+ and a vertex half-angle $\beta$, in which $\beta=30°$ in a preferred manner; a second truncated-cone shaped bore 119 with a taper in the direction X+ and a vertex half-angle $\gamma$, in which $\gamma=10°\pm1°$ in an advantageous manner; a third regular cylindrical bore 121; and a fourth truncated-cone shaped bore 123 with a taper in the direction X– and a vertex half-angle $\alpha$, in which $\alpha=10°\pm1°$ in a preferred manner. The inner surface 115 permits, a rocking motion in the direction +θ and in the direction –θ about a transverse axis 125 passing through O, which is the centre of the central opening 32.

In an advantageous manner, the revolution profile of the inner surface 115 results from a machining process and, more particularly, from two successive machining operations. The first machining operation takes place with an inclination of the key about the axis 125 by an angle $\chi$ in relation to the longitudinal plane of symmetry of the key 31, at right angles to a plane 126 in a direction +θ while, in the second machining operation, the key is inclined in a direction –θ about the axis 125 by an angle $\chi$ in relation to the longitudinal plane of symmetry of the key, $\chi$ having a value of 2.5°±0.1° in an advantageous manner.

Advantageously too, the axial length of the bore 123 is equal to the axial length of the bore consisting of bores 117 and 119, and the axial length of each bore is selected so as to enable the key to be locked and unlocked in relation to the sleeve 18.

In an advantageous manner, the tilt angle of the key ranges between –3.5°±0.6° and +3.5°±0.6° in relation to the longitudinal plane of symmetry of the key, for a sleeve diameter gauge of 15.05 mm.

The junction of the bores 119 and 121 follows a fillet A and the junction of the bores 121 and 123 follows a fillet B.

The key 31 is arranged about the front section 81 of the plunger 8, the face 107 being directed towards the brake pedal. The second indexing part 34 of the key 31 rests on the pneumatic piston 5 by means of the resilient element 36, advantageously a helical spring, compressively fitted between the pneumatic piston 5 and the key 31. The spring is mounted, at a first end, through a. groove. cut in the piston 5 and, at a second end, on the teat 111. At rest, the first indexing part 33 bears on the stationary part of the servomotor via the bearing means 105.

The locking and unlocking of the key 31 in relation to the sleeve 18 are carried out in the following way.

Since the operation of the servomotor in the case of an emergency braking situation, has been described hereinabove, only the locking and unlocking of the key will be explained hereunder. On a braking operation, implying the assistance process, the indexing part 33 is no longer in contact with the stationary part of the servomotor, the spring 36 causing the key 31 to rotate about the pin-forming tongue 109 in the direction +θ, and the key 31 is latched on the sleeve 18, fitted within the opening 32 for a rectilinear translation, since it cooperates with the periphery of the sleeve 18 through the abutment of the edges of the central opening 32, at least at two points of contact A' and B' between the outer periphery of the sleeve and the inner surface of the central opening 32, these points of abutment A' and B' being located on the fillets A and B, preferably. and respectively. Besides, B' is symmetrical with A' about O.

At the end of the braking operation, the unlocking of the key 31 in relation to the sleeve 18 takes place when the indexing part 33 is pushed back by the rear ring of the servobrake.

In this preferred embodiment of the locking key according to the invention, the return of the piston 5 to its rest position, at the end of the braking operation, is not slowed down and, at rest, the system consisting of the pin and the key is unlocked effectively. Both operating conditions result from a judicious choice of the tilt angle between the key and the sleeve.

As appears from the preceding description, the present invention makes it possible to keep the valve 9 wide open during the greatest part of the brake-releasing phase following an emergency braking operation, that is to keep on applying a braking force much greater than that which would be obtained, without the present invention, by the mere braking force actually provided by the driver.

We claim:

1. A pneumatic servomotor for an assisted braking, comprising: a rigid casing; a moving airtight partition wall that defines a front chamber and a rear chamber inside said casing, said front chamber being operatively under a first pressure and said rear chamber being selectively connected to said front chamber or to a second pressure having a higher level than said first pressure; a pneumatic piston travelling with said moving partition wall; a control rod that moves inside of said piston as a function of an input force for selectively exerted in an axial actuation direction towards said front chamber and a function of a return force applied by a main spring in an axial return direction that is opposed to the axial actuation direction of the input force, said return force biasing said control rod towards a rest position while said input force biases said control rod towards an intermediate actuation position or an end actuation position, depending on whether said input force is applied at a speed that is lower or higher than a given limit speed; a plunger that is housed within said piston and driven by said control rod; a three-way valve that has an annular seat borne by a rear section of the plunger, said three-way valve connecting said rear chamber with the front chamber when the control rod is in said rest position and subjecting said rear chamber to said second pressure when said control rod is in an actuation position; force-transmitting means for receiving and transmitting at least one assistance force exerted by a front face on said piston when said three-way valve puts said rear chamber under said second pressure, said plunger including a front section comprising retaining means for tying said front section of said plunger to said pneumatic piston, said retaining means comprising a unidirectional clutch device for the driving of said force-transmitting means independently of said control rod and said rear section of said plunger when biased by said pneumatic piston resulting from the actuation of said control rod at a speed that is higher than a predetermined value characterised in that said unidirectional clutch device comprises a cylindrical sleeve that freely slides around a front part of said rear section of said plunger and a locking key having a central opening that surrounds said sleeve, an inner diameter that is slightly greater than an outer diameter of said cylindrical sleeve, and a first and a second indexing parts that are diametrically opposed in relation to said central opening.

2. The servomotor according to claim 1, characterised in that, at rest and under the action of a resilient means, said locking key bears on a stationary part of the servomotor through said first indexing part and on said pneumatic piston through the second indexing part.

3. The servomotor according to claim 2, characterised in that, at rest, said first indexing part of said locking key bears on an intermediate element that in turn bears on a stationary part of said servomotor.

4. The servomotor according to claim 3, characterised in that said unidirectional clutch device is contained in a cartridge that constitutes said front face of said pneumatic piston and in that said intermediate element protrudes rearward from said cartridge.

5. The servomotor according to claim 1, characterised in that, at rest, said cylindrical sleeve is biased backwards into abutment against a shoulder located on said rear section of said plunger via a resilient means.

6. The servomotor according to claim 5, characterised in that said front section of said plunger comprises a finger that is slidingly fitted on said front end of said rear section of said plunger, said finger being capable of contacting a reaction disk when said sleeve is biased by said locking key as a result of the actuation of the control rod at a speed of which is higher than said predetermined value.

7. The servomotor according to claim 1, characterised in that said rest position of said plunger is defined by said locking, under the action of said main spring bearing on a stop situated on said rear section of said plunger.

8. The servomotor according to claim 7, characterised in that said stop, located on said rear section of said plunger is constituted by a pin, said pin being perpendicular to an axis of said plunger and passing through elongated openings located inlaid sleeve.

9. The servomotor according to claim 7, characterised in that said stop, located on said rear section of said plunger consists of a shoulder that co-operates with at least one part of said locking key that traverses a slot in said sleeve.

10. The servomotor according to claim 1 for providing assisted braking, characterised by said locking key including, at a first end, a first indexing part and at a second end, a second indexing part and in a central area, an opening, said opening having an inner surface with a revolution profile capable of co-operating with an outer surface of said sleeve.

11. The servormotor according to claim 1 for providing assisted braking, characterised in that said locking key comprises has a first end with a first indexing part thereon, a second end with a second indexing part thereon and a central area with an opening therein, said opening having an inner surface with a revolution profile that co-operating with a sleeve of said retaining means.

* * * * *